United States Patent
Kuhn

(10) Patent No.: US 6,698,704 B2
(45) Date of Patent: Mar. 2, 2004

(54) FIXING DEVICE

(75) Inventor: Peter Kuhn, München (DE)

(73) Assignee: Mavig GmbH, München (DE)

( * ) Notice: Subject to any disclaimer, the term of this patent is extended or adjusted under 35 U.S.C. 154(b) by 0 days.

(21) Appl. No.: 10/204,233

(22) PCT Filed: Jul. 9, 2001

(86) PCT No.: PCT/EP01/07893

§ 371 (c)(1),
(2), (4) Date: Aug. 19, 2002

(87) PCT Pub. No.: WO02/14735

PCT Pub. Date: Feb. 21, 2002

(65) Prior Publication Data

US 2003/0006352 A1 Jan. 9, 2003

(30) Foreign Application Priority Data

Aug. 17, 2000 (DE) ..................... 200 14 249 U
Sep. 6, 2000 (DE) ..................... 200 15 399 U

(51) Int. Cl.⁷ .............................. F21V 21/26; F21S 8/06
(52) U.S. Cl. ..................... 248/343; 248/324; 362/404
(58) Field of Search ............................. 248/323, 324, 248/343, 282.1; 362/404

(56) References Cited

U.S. PATENT DOCUMENTS

| | | | | |
|---|---|---|---|---|
| 3,240,925 A | | 3/1966 | Paschke et al. ............ | 362/33 |
| 3,512,743 A | * | 5/1970 | Lipscomb ................. | 248/324 |
| 4,427,382 A | | 1/1984 | Hoffmeister et al. ....... | 433/79 |
| 5,720,570 A | | 2/1998 | Cole et al. ............... | 403/256 |
| 5,779,216 A | * | 7/1998 | Grace et al. .............. | 248/651 |
| 6,030,103 A | | 2/2000 | Gampe et al. ............ | 362/404 |

FOREIGN PATENT DOCUMENTS

| | | |
|---|---|---|
| CH | 522 853 | 6/1972 |
| DE | 1 193 897 | 6/1965 |
| DE | 31 09 721 A1 | 9/1982 |
| DE | 89 13 757 U1 | 5/1991 |
| DE | 197 02 222 A1 | 7/1997 |
| DE | 298 18 108 U1 | 3/1999 |
| DE | 200 15 399 U1 | 2/2001 |
| EP | 0 392 303 A1 | 10/1990 |
| FR | 2 492 014 | 4/1982 |
| WO | WO 002/22342 | 4/2000 |

OTHER PUBLICATIONS

U.S. patent application publication No. US 2002/0015296 A1, Howell et al., Feb. 7, 2002.*

* cited by examiner

Primary Examiner—Ramon O. Ramirez
Assistant Examiner—Jon Szumny
(74) Attorney, Agent, or Firm—Scully, Scott, Murphy & Presser

(57) ABSTRACT

A fixing device (1) for fixing at least one support arm (45), in particular a spring arm. Said device comprises a base body (2), which has a connecting section (4) located in the axial direction (28) at the upper end of the base body (2) for suspending the fixing device (1) and at least one bearing section (5), which is at least partially cylindrical, whereby a bearing sleeve (44) of the support arm (45) can be mounted onto said bearing section (5). The latter (5) lies in the axial direction (28) at the lower end of the base body (2) and projects axially beyond the rest of said base body (2). In addition, a retaining ring (46) can be fixed to the bearing section (5) for retaining the bearing sleeve (44) of the support arm (45) on the bearing section (5). The bearing sleeve (44) is at least indirectly supported on the retaining ring (46) and can be rotated about the axis (3) of the bearing section (5).

12 Claims, 2 Drawing Sheets

Figure 4:
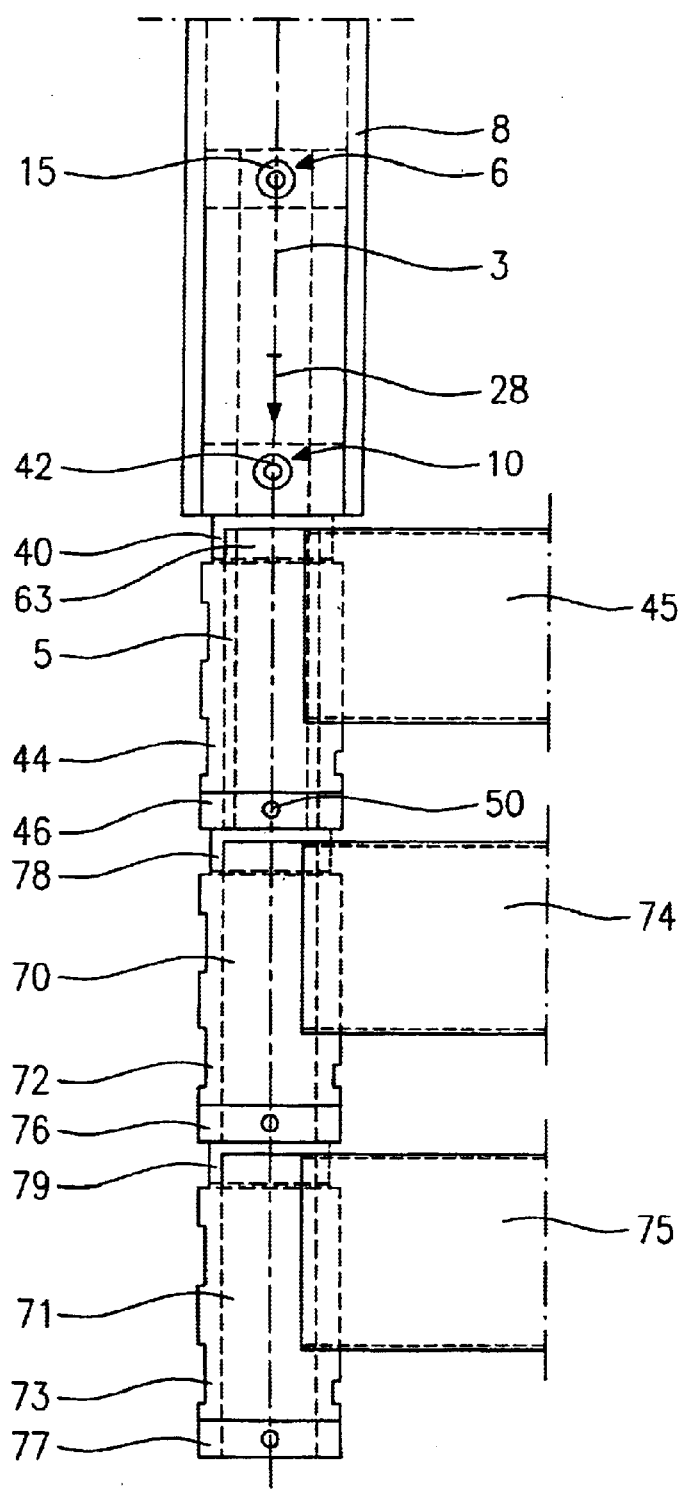

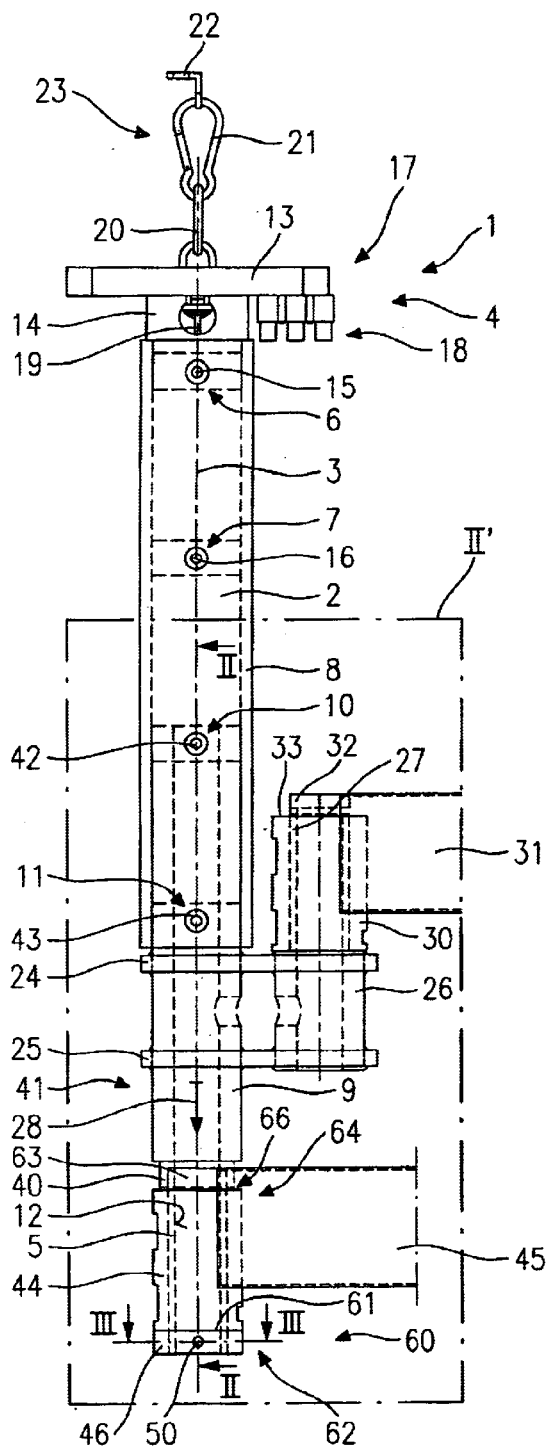
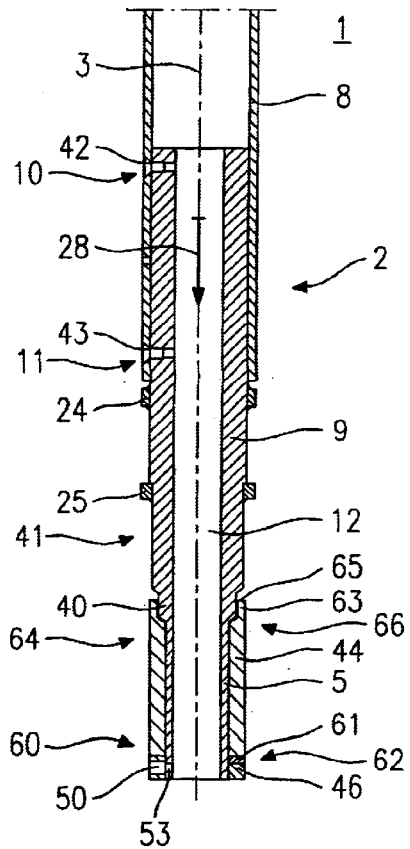
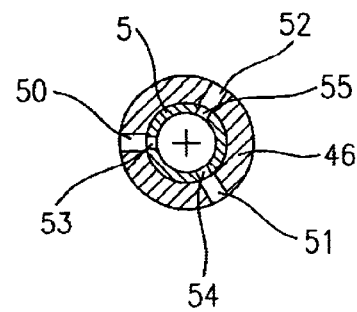
Fig. 1
Fig. 2
Fig. 3

FIXING DEVICE

The invention relates to a fixing device for fixing at least one support arm, in particular a spring arm.

For the purpose of supporting medical apparatus, in hospitals, doctors' practices and similar establishments supports are used which are suspended on the ceiling of the particular treatment room or operating theatre by way of a support arm which is preferably constructed as a spring arm. This ensures that the floor of the treatment room or operating theatre is always freely accessible and, in particular, easy to clean and to disinfect, so that the specified hygiene requirements can be fulfilled. In order to suspend the support arm on the ceiling of the particular treatment room or operating theatre, a fixing device is required, which, where possible, enables the support arm to be pivoted horizontally so that, if necessary, in conjunction with the adjustment possibilities afforded by the support arm, it is possible to effect a relative change in the orientation and position of the medical apparatus in the treatment room or operating theatre.

A fixing device of this type is provided for example by the fixing device disclosed in DE 298 18 108 U1, which has the generic features of claim 1. The known fixing device has a base body, which may be fixed to the ceiling by a connecting element, for example by means of screwed inserts, arranged on a connecting portion of the base body. Provided alongside the base body, there are two mutually opposing bearing journals which are open towards the top, i.e. in the direction of the ceiling, and which are connected towards the bottom, i.e. in the direction of gravity, to bearing plates. It is possible to push a bearing sleeve of a support arm onto each bearing journal, the bearing sleeve being supported against gravity by the bearing plates. Part of the base body of the fixing device is arranged between the two bearing journals.

The fixing device known from DE 298 18 108 U1 has several disadvantages. Since the bearing journals are arranged alongside the base body, the rotatability of a support arm fixed on the bearing journal by means of its bearing sleeve is substantially restricted, since the support arm strikes the base body of the fixing device after a certain degree of rotation. Moreover, the rotatability of the support arm is further impaired since the two bearing journals lie opposite one another and thus the rotation of the support arm is impaired by the support arm fixed on the other bearing journal.

A further disadvantage of the known fixing device is that, as a result of the fact that the bearing journal is arranged alongside the base body, the bearing-journal axis, which defines the axis of rotation of the support arm, is spaced from the centre axis of the base body, producing a lever arm as a result of the spacing. Consequently, the weight-induced force of the spring arm and the apparatus fixed thereto, which acts on the bearing journal, generates a torque acting on the fixing device, so that, in addition to the weight-induced load, an additional torque-induced load has to be taken up by the fixing device and the connection between the fixing device and the said ceiling.

Moreover, in the case of the known fixing device, in the event of an—in particular jolt-like—raising of the support arm for the purpose of changing for example the vertical position of an apparatus, there is a risk of the bearing sleeve of the support arm springing out of the bearing journal, which can result in considerable human injury and damage to equipment.

Therefore, the object of the invention is to provide a fixing device which enables a support arm fixed thereto to rotate in a desired manner, in particular any manner, whilst preventing an unnecessary load on the fixing device and taking into account the stringent safety requirements.

The object is achieved by a subject-matter having the features of claim 1. Advantageous further developments of the invention are possible as a result of the measures described in the subclaims.

The fixing device according to the invention has the advantage that the support arm fixed to the bearing portion of the base body by means of the bearing sleeve is capable of rotating in any manner, since the bearing portion is arranged in the axial direction at the lower end of the base body and projects axially beyond the remaining base body, so that the fixed spring arm is not impeded by the base body during pivoting. Moreover, the bearing sleeve of the support arm is held on the bearing portion by means of a retaining ring which may be fixed to the bearing portion, so that the bearing sleeve of the support arm is secured by the retaining ring and can only be removed once the retaining ring is released from the fixing device. The bearing portion is furthermore arranged in the axial direction at the lower end of the base body, so that a weight-induced force acting on the bearing sleeve fixed to the bearing portion produces at least substantially no additional torque which acts on the fixing device.

In advantageous manner, a first bearing element is provided which at least partially surrounds the bearing portion of the base body and at least partially abuts against the retaining ring, the bearing sleeve being supported on the retaining ring by means of the first bearing element. The first bearing element and the retaining ring form a first bearing in which the bearing sleeve of the support arm is supported.

Here, support is provided at least in the axial direction of the base body, i.e. in the direction of gravity, in order to ensure the rotatability of the support arm even under a heavy load, produced for example when a heavy apparatus is fixed to the support arm. It is possible for the first bearing formed by the first bearing element to also provide radial support, particularly when high torque-induced forces acting on the bearing sleeve are expected.

It is furthermore advantageous that a second bearing element is provided, which at least partially surrounds the bearing portion of the base body and forms a second bearing for supporting the bearing sleeve, said second bearing lying opposite the first bearing formed by the first bearing element. Thus, the bearing sleeve is supported on both sides, ensuring particularly good rotatability of the support arms.

In advantageous manner, the second bearing element of the second bearing is constructed in the form of a sleeve, radial support being provided by the second bearing. It is furthermore advantageous that the first bearing element of the first bearing is constructed in the form of a circular ring, axial support being provided by the first bearing. Since, owing to the geometrical arrangement, the weight-induced force of the support arm acts substantially on the first bearing, whilst any torque produced acts almost exclusively on the second bearing, the spring arm is thus supported in a manner which is adapted to the load. For the purpose of taking up any torque produced, it is nevertheless advantageous that the second bearing also provides axial support and/or the first bearing also provides radial support.

In advantageous manner, the retaining ring may be fixed to the bearing portion of the base body by at least one retaining screw. Here, the retaining screw can engage in a threaded bore constructed in the bearing portion of the base body, or in a groove constructed in the bearing portion of the base body. The retaining screw can nevertheless be applied against the surface of the bearing portion of the base body with an arresting force for the purpose of generating a static friction force for fixing the retaining ring. In any case, the retaining screw provides numerous fixing possibilities, which can be realised in constructively simple manner.

It is advantageous that the external diameter of the retaining ring corresponds at least approximately to the external diameter of the bearing sleeve of the support arm to be fixed. Thus, the reliability of the retention of the bearing sleeve of the support arm is improved by means of the retaining ring fixed to the bearing portion of the base body, since, for geometrical reasons, mechanical influence, for example due to a cable hanging down, is prevented from affecting the retaining ring.

It is advantageous that the base body is constructed at least substantially in the form of a tube, since this enables a compact construction of the fixing device to be achieved.

It is advantageous that the fixing device has a securing means which may be fixed to the connecting portion of the base body for the purpose of securing a connection which is formed by the connecting portion for the purpose of suspending the fixing device. Here, the fixing device can be fixed to the ceiling of the treatment room or operating theatre for example by means of a connecting portion. If the connection becomes loose, for example as a result of an excess load or an accident, then the securing means supports the drop of the fixing device and thus at least partially the suspension of the support arm.

In advantageous manner, a plurality of bearing portions are provided for fixing a plurality of support arms, which are arranged successively in the axial direction of the base body, each of the bearing sleeves of the support arms abutting against at least one retaining ring for the purpose of support. It is thus possible for a plurality of support arms to be fixed to the fixing device in rotatably supported manner. As a result of the successive arrangement of the respective bearing portions in the axial direction of the base body, each of the support arms is able to rotate fully, without the rotatability of one support arm being influenced by the other support arms.

It is advantageous that the fixing device has a bearing journal arranged alongside the base body, it being possible to push a bearing sleeve of a support arm onto said bearing journal. It is thus possible to use the space available alongside the base body to fix a support arm for which total rotatability is not required.

Exemplary embodiments of the invention are illustrated in simplified manner in the drawing and explained in more detail in the description below. There is shown:

FIG. 1 a fixing device according to a first exemplary embodiment of the invention;

FIG. 2 that detail of the fixing device which is denoted by II' in FIG. 1 according to the first exemplary embodiment, in an axial sectional illustration along the section line denoted by II;

FIG. 3 a section through the fixing device according to the first exemplary embodiment along the section line denoted by III in FIG. 1; and FIG. 4 that detail denoted by II' in FIG. 1 according to a second exemplary embodiment of the invention.

FIG. 1 shows a first exemplary embodiment of a fixing device 1 according to the invention. The fixing device 1 serves for fixing a support arm, in particular a spring arm, to a ceiling of a treatment room of a medical establishment or the like. By means of the support arm fixed to the ceiling by the fixing device, it is possible to suspend in particular screen viewing instruments and other medical instruments such that they are clear of the floor. However, the fixing device 1 is also suitable for other applications.

The fixing device 1 comprises a base body 2 having a connecting portion 4, which, with respect to the axis 3 of the base body 2, is arranged in the axial direction at the upper end of the base body 2, and a bearing portion 5, which is arranged in the axial direction at the lower end of the base body 2. The connecting portion 4 is connected to a tubular intermediate portion 8 of the base body 2 by means of screw connections 6, 7. The bearing portion 5 is constructed on a bearing body 9, which is screwed to the intermediate portion 8 by means of the screw connections 10, 11. In order to reduce the weight of the bearing body 9, this latter has an axial through bore 12. When the fixing device 1 is fixed to a rail attached to the ceiling by means of a moving carriage, the through bore 12 moreover serves as a through bore for the brake-rod unit of the moving carriage.

The connecting portion 4 of the base body 2 has a connecting plate 13 and a connecting body 14, which is connected to the connecting plate 13 and into which the screws 15, 16 of the screw connections 6, 7 are screwed. Provided along the periphery of the connecting plate 13, there are a plurality of connecting points, in particular three connecting points, of which the connecting point 17 is illustrated in FIG. 1. According to the first exemplary embodiment, screw elements 18 are arranged on the connecting point 17 and enable the fixing device 1 on the connecting plate 13 to be connected to the ceiling of a treatment room or the like.

The connecting body moreover has a securing eye 19, which is connected to a securing chain 20. Here, the securing chain 20 in the exemplary embodiment described comprises two chain elements. The securing chain 20 connects the securing eye 19 to a securing karabiner 21, which is constructed as a snap karabiner. The securing karabiner 21 may be suspended in a securing element 22, which is of an angular construction in the exemplary embodiment described. The securing element 22 and the connecting plate 13 can be fixed to the same ceiling. The connecting plate 13 and the securing element 22 can also be fixed to different ceilings, particularly when the connecting plate 13 is fixed to an intermediate ceiling. The securing eye 19, the securing chain 20, the securing karabiner 21 and the securing element 22 form a securing means 23 of the fixing device 1, which secures a connection which is formed by the connecting plate 13 of the connecting portion 4 for the purpose of suspending the fixing device 1. So that all the components of the fixing device 1 are secured, the securing eye 19 is fixed to the bearing element 9.

The bearing body 9 is connected to a bearing journal 26 by means of the connecting plates 24, 25, the connections being produced for example by welding or hard soldering. The bearing journal 26 has a cylindrical bearing portion 27, which is open towards the top, i.e. in opposition to the axial direction 28 along the axis 3 of the base body 2 of the fixing device 1. When the fixing device is assembled, the axial direction 28 of the base body 2 is preferably orientated at least substantially in the direction of gravity, i.e. the axial direction 28 points downwards. A bearing sleeve 30 of a support arm 31 may be pushed onto the bearing portion 27 in order to fix the support arm 31 to the fixing device 1. Here, the weight-induced force of the support arm 31, and the weight-induced forces acting on the support arm 31, hold the bearing sleeve 30 of the support arm 31 against gravity, i.e. in the direction 28, on the bearing portion 27 of the bearing journal 26 of the fixing device 1. It is advantageous here that the bearing portion 27 of the bearing journal 26 projects at its upper end 32 beyond the upper edge 33 of the bearing sleeve 30, which is pushed completely onto the bearing portion 27, in order to achieve advantageous support and to prevent the bearing sleeve 30 being released from the bearing portion 27 of the bearing journal 26 in the event of the support arm 31 being raised with respect to the fixing device 1. In order to secure the bearing sleeve 30, it is possible to provide a spring lock washer which is arranged at the upper end 32 of the bearing journal 26. Alternatively, a securing spring, which prevents the bearing sleeve 30 from being raised, can be arranged at the upper end 32 of the bearing journal 26.

The first exemplary embodiment of the invention is described in more detail below, with additional reference to FIG. 2. Here, corresponding elements are provided with the same reference numerals in FIG. 2 and in all of the other Figures, which means that it is possible to avoid repetitious description.

FIG. 2 shows that detail of the fixing device 1 which is characterised by II' in FIG. 1 in an axial sectional illustration along the section line denoted by II.

The bearing body 9 has an intermediate shoulder 40, at which the bearing portion 5 merges into the connecting part 41 of the bearing body 9, on which the screws 42, 43 of the screw connections 10, 11 engage in the bearing body 9 and the connecting plates 24, 25 are fixed. The bearing portion 5 has a constant cross-section in the axial direction 28 and is open towards the bottom, i.e. in the axial direction 28. A bearing sleeve 44 of a support arm 45 is mounted on the bearing portion 5. A retaining ring 46 is moreover mounted on the bearing portion 5, it being possible to connect said retaining ring to the bearing portion 5 for the purpose of holding the bearing sleeve 44 of the support arm 45 on the bearing portion 5.

In the exemplary embodiment described, the connection is effected by way of three screw connections, which are described in more detail below with reference to FIG. 3. Here, FIG. 3 shows a section through the fixing device 1 according to the first exemplary embodiment along the section line denoted by III in FIG. 1.

The retaining ring 46 has threaded bores 50, 51, 52 which are arranged opposite the bores 53, 54, 55 in the bearing portion 5 of the bearing body 9. Screw elements are screwed into the threaded bores 50, 51, 52 of the retaining ring 46 for the purpose of fixing the retaining ring 46 on the bearing portion 5 of the bearing body 9, said screw elements having a pin-shaped portion at their end, which engages in the bores 53, 54, 55 in the bearing portion 5. This secures the retaining ring 46 against torsion and also against axial displacement with respect to the axis 3 of the base body 2.

As illustrated in FIGS. 1 and 2, the bearing sleeve 44 is supported on the retaining ring 46 at its lower first end 60 by means of a first bearing element 61. The first bearing element 61 is constructed in the form of a circular ring, so that the first bearing 62 formed by the first bearing element 61 ensures that the bearing sleeve 44 is supported axially. The axial displacement of the bearing sleeve 44 in opposition to the axial direction 28 is delimited by the intermediate shoulder 40, the bearing sleeve 44 having a circular collar 63 which at least partially surrounds the intermediate shoulder 40. A second bearing element 65 is provided at the upper second end 64 of the bearing sleeve 44, between the bearing sleeve 44, in particular the circular collar 63, and the bearing body 9, in particular the intermediate shoulder 40. The second bearing element 65 forms a second bearing 66, which principally ensures that the bearing sleeve 44 is supported radially and, to some extent, axially. Here, the second bearing element 65 is constructed substantially in the form of a sleeve, whereby it at least partially surrounds the intermediate shoulder 40 at its lower end, i.e. on the side of the bearing portion 5.

In that exemplary embodiment of the invention described, the bearing elements 61, 65 surround the bearing body 9, and in particular the bearing portion 5, radially, in which arrangement it is possibly also sufficient for at least one of the bearing elements 61, 65 to surround the bearing body 9, and in particular the bearing portion 5, only partially or in portions in order to ensure the desired support.

Since the second bearing element 65 surrounds the bearing portion 5 in the region where it has a widened diameter, i.e. at the intermediate shoulder 40, it is ensured that displacement of the second bearing element 65 in an axial direction, in particular in the axial direction 28, i.e. in the direction of gravity, is prevented. Since the first bearing element 16 is constructed in the form of a disc and is arranged between the bearing sleeve 44 and the retaining ring 46, displacement of the first bearing element 61 in an axial direction is in any case prevented.

The intermediate portion 8, the bearing body 9 and the connecting body 14 of the fixing device are constructed at least substantially in the form of a tube, so that the base body 2 of the fixing device 1, which is composed substantially of these components, is likewise constructed at least substantially in the form of a tube. Thus, with a low weight, a high degree of mechanical stability, in particular torsion-resistance, of the fixing device 1 is achieved, as a result of which the fixing device 1 withstands high torque-induced forces. In the exemplary embodiment described, the bearing body 9, the bearing sleeve 44 and the retaining ring 46 have at least substantially the same external diameter, thus resulting in a compact construction.

Since the bearing sleeve 44 supported in the two bearings 62, 66 may be rotated through 360° about the axis 3 of the bearing portion 5 of the base body 2, the support arm 45 connected to the bearing sleeve 44, for example by welding, may be pivoted freely about the axis 3 in any manner.

FIG. 4 shows that detail of the fixing device 1 which is denoted by II' in FIG. 1 according to a second exemplary embodiment.

According to the second exemplary embodiment, the base body 2 has a plurality of bearing portions 5, 70, 71 on which the support arms 45, 74, 75 are fixed by means of the bearing sleeves 44, 72, 73. Here, each of the bearing sleeves 44, 72, 73 is supported on a retaining ring 46, 76, 77. Here, the retaining rings 46, 76 each have a portion, 78 and 79 respectively, having a smaller diameter in order to form a shoulder for the adjoining bearing sleeve 72 or 73, which shoulder corresponds to the intermediate shoulder 40, is at least partially surrounded by a bearing element corresponding to the second bearing element 65, and is at least partially encompassed by the subsequent bearing sleeve 72 or 73 at its upper end. The last, i.e. the bottom-most, retaining ring 77 is constructed according to the retaining ring known from the first exemplary embodiment, since it is not adjoined by a further bearing sleeve.

Since the support arms 45, 74, 75 are arranged mutually offset in the axial direction with respect to the axis 3, they can be pivoted independently from one another through 360°.

The invention is not restricted to the exemplary embodiments described. According to the second exemplary embodiment, it is particularly possible to provide any number of bearing portions in order to fix any number of support arms to the base body 2. It is moreover possible for one or more bearing portions arranged mutually offset in the axial direction, and one or more bearing journals arranged alongside the base body 2, to be provided on a fixing device.

What is claimed is:

1. A fixing device (1) for fixing at least one support arm (45), in particular a spring arm, having a base body (2), which has a connecting portion (4) arranged in the axial direction (28) at the upper end of the base body (2) for the purpose of suspending the fixing device (1), and at least one bearing portion (5) which is at least partially cylindrical, it being possible to mount a bearing sleeve (44) of the support arm (45) on the bearing portion (5), characterised in that the bearing portion (5) is arranged in the axial direction (28) at the lower end of the base body (2) and projects axially beyond the remaining body (2), and a retaining ring (46) being fixed to the bearing portion (5) for holding the bearing sleeve (44) of the support arm (45) on the bearing portion (5), the external diameter of the retaining ring (46) corresponding at least approximately to the external diameter of the bearing sleeve (44) of the support arm (45), the bearing sleeve (44) being at least indirectly supported on the retaining ring (46) and being rotatable about the axis (3) of the bearing portion (5).

2. The fixing device according to claim 1, characterised in that the bearing sleeve (44) is rotatable through an angle of 360° about the axis (3) of the bearing portion (5).

3. The fixing device according to claim 1, characterised in that a second bearing element (65) is provided, which at least partially surrounds the bearing portion (5) of the base body (2) and forms a second bearing (66) for supporting the bearing sleeve (44), which lies opposite the first hearing (62) formed by the first bearing element (61).

4. The fixing device according to claim 3, characterised in that the second bearing element (65) surrounds the bearing portion (5) in a region (40) which has a widened diameter.

5. The fixing device according to claim 3 or 4, characterised in that the second bearing element (65) of the second bearing (66) is constructed in the form of a sleeve, radial support being provided by the second bearing (66).

6. The fixing device according to claim 1, characterised in that the first bearing element (61) of the first bearing (62) is constructed in the form of a circular ring, axial support being provided by the first bearing (62).

7. The fixing device according to claim 1, characterised in that the retaining ring (46) is fixed to the bearing portion (5) of the base body (2) by at least one retaining screw.

8. The fixing device according to claim 1, characterised in that the bearing portion (5) of the base body is constructed in the form of a tube.

9. The fixing device according to claim 1, characterised in that the base body (2) is constructed at least substantially in the form of a tube.

10. The fixing device according to claim 1, characterised in that the fixing device (1) has a securing means (23) which is fixed to the connecting portion (4) of the base body (2) for securing a connection which is formed by the connecting portion (4) for the suspending of the fixing device (1).

11. The fixing device according to claim 1, characterised in that a plurality of bearing portions (5, 70, 71) are provided for fixing a plurality of support arms (45, 74, 75), which are arranged successively in the axial direction (28) of the base body (2), each of the bearing sleeves (44, 72, 73) of the support arms (45, 74, 75) abutting against at least one retaining ring (46, 76, 77) for providing support thereof.

12. The fixing device according to claim 1, characterised in that the fixing device (1) has a bearing journal (26) arranged alongside the base body (2), to facilitate the pushing of a bearing sleeve (30) of a support arm (31) onto said bearing journal (26).

* * * * *